(No Model.) 3 Sheets—Sheet 2.
D. H. WILSON.
ELECTRIC FENCE STATION DEVICE.
No. 457,296. Patented Aug. 4, 1891.
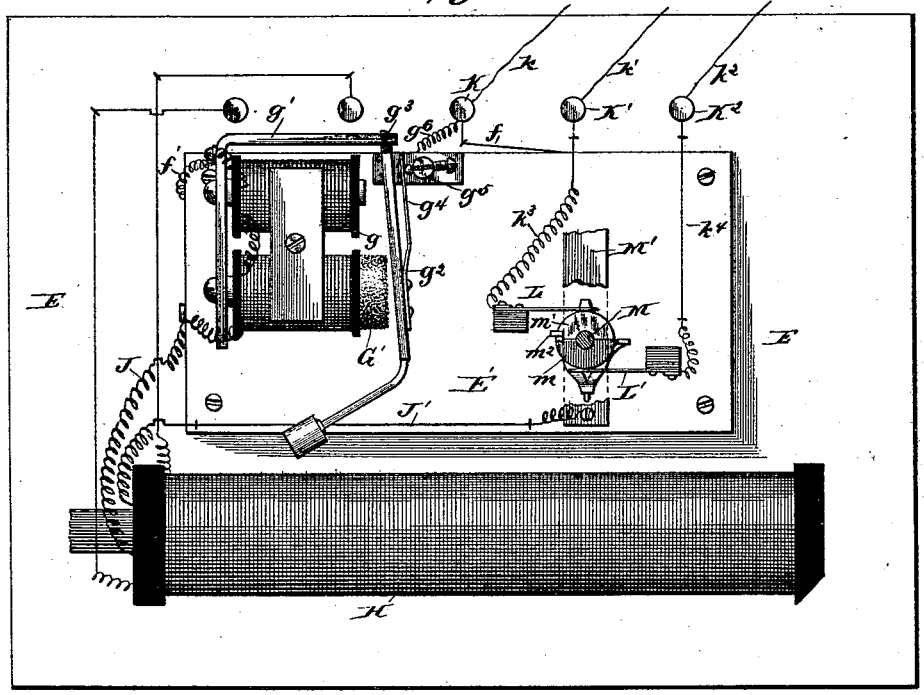
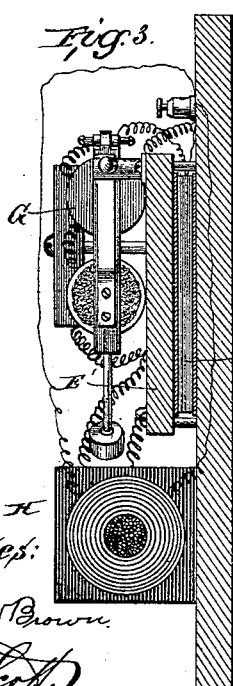
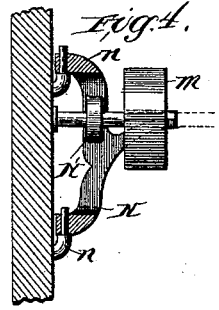
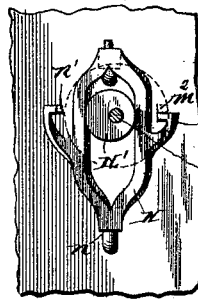
Witnesses:
Flora L. Brown
W. H. Scott
Inventor:
David H. Wilson,
By Charles T. Brown,
Atty (No Model.) 3 Sheets—Sheet 3.

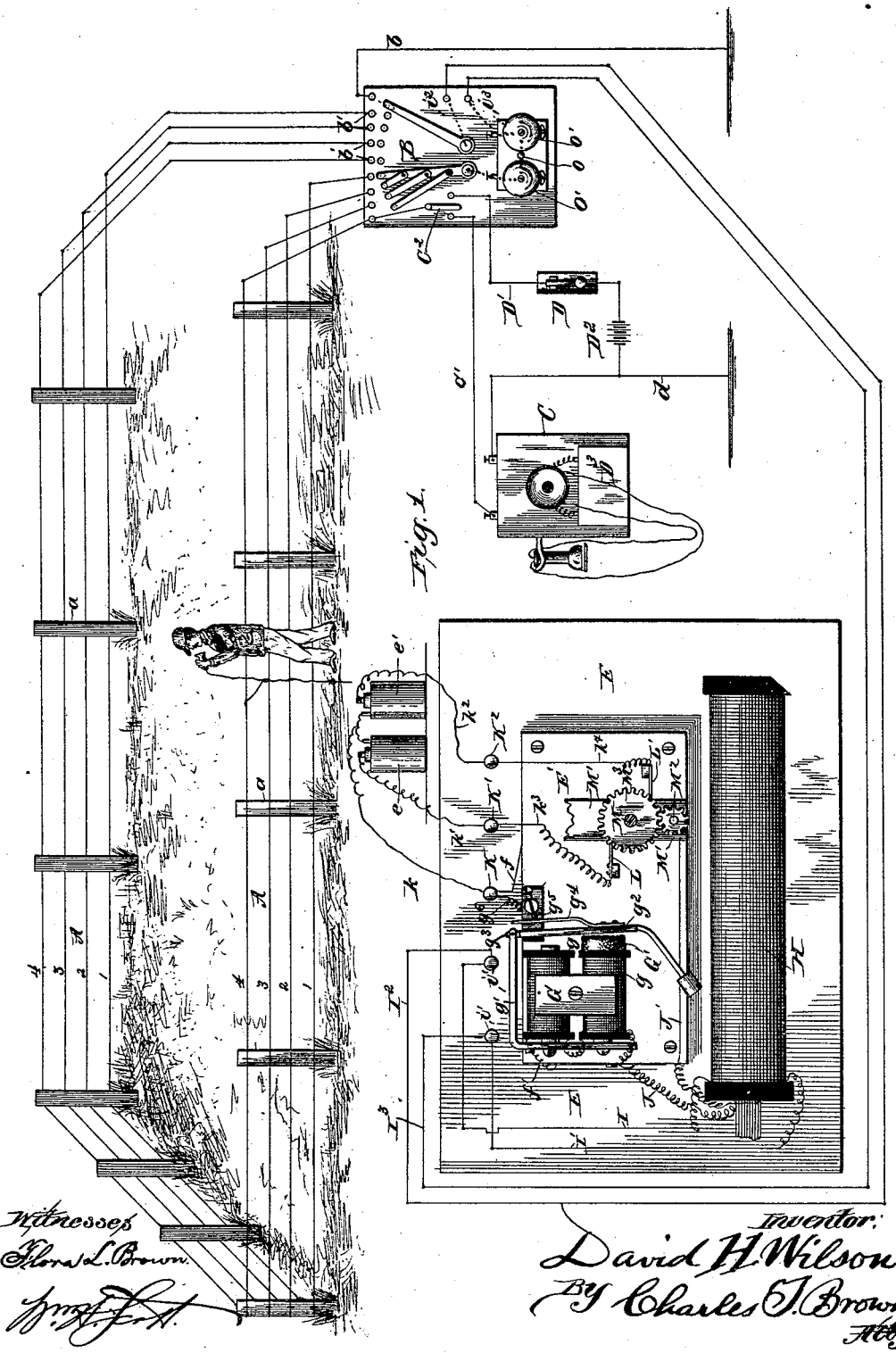

D. H. WILSON.
ELECTRIC FENCE STATION DEVICE.

No. 457,296. Patented Aug. 4, 1891.

Fig. 7.

Witnesses:
Flora L. Brown.
Lute S. Alter.

Inventor:
David H. Wilson,
By Charles T. Brown,
Atty.

UNITED STATES PATENT OFFICE.

DAVID H. WILSON, OF NORMAL, ASSIGNOR TO THE AMERICAN ELECTRIC FENCE COMPANY, OF CHICAGO, ILLINOIS.

ELECTRIC-FENCE-STATION DEVICE.

SPECIFICATION forming part of Letters Patent No. 457,296, dated August 4, 1891.

Application filed August 25, 1890. Serial No. 362,995. (No model.)

*To all whom it may concern:*

Be it known that I, DAVID H. WILSON, a citizen of the United States, residing at Normal, in the county of McLean and State of Illinois, have invented certain new and useful Improvements in Devices for Electric-Fence Stations, of which the following, reference being had to the drawings accompanying and forming a part hereof, is a full and complete specification.

My invention relates to devices adapted to form a part of the necessary electrical appliances for generating and maintaining a constant current of electricity of the character and strength required in an electrical fence. An electrical fence, as is well known to those familiar with the art, is composed of wire supported upon posts and forming the strands of the fence, one end of each of such strands of wire being connected with the electrical generator and the other end disconnected therefrom and from the ground, but adapted to be connected therewith when desired, or to be grounded by any animal or other conductor coming in contact therewith and with the ground, thereby completing the electrical circuit through such ground and a ground-wire extending from the electrical generating device to a ground-plate. The purposes of the electric fence are accomplished by the completion of the circuit upon the grounding of any of the wires thereof with the animal or thing so grounding the wires or any of them forming an element in such circuit, and thereby in the case of an animal receiving an electric shock, the character of the shock depending upon the appliances employed in generating the current.

I am aware that an electric fence having the same purpose in view as is sought by me, so far as the protection of the fence by subjecting animals coming in contact therewith and with the ground to an electric shock, has been heretofore constructed, in which a magneto-electric generator driven by any motor desired—such as a windmill, water-wheel, or steam-engine—has been employed for producing the required electric current, and such a fence, with the necessary appliances for generating such a current of electricity, is illustrated and described in Patent No. 343,939, dated June 15, 1886. I am also aware that prior to the construction by me of the fence described in the patent last named an electrical fence had been constructed composed of wire or other metal conductor, open or disconnected at one end and charged with electricity obtained by means of an induction-coil having the usual automatic circuit-breaker, and having a battery electrically connected with the primary wires of such induction-coil, whereby an animal or other conducting-body upon the earth coming in contact with the fence would complete the circuit and be submitted to a shock more or less severe according to the strength of the current; but in the electrical fences heretofore made, wherein the current of electricity employed for repelling animals from the fence has been generated by an induction-coil, the ringing of an alarm-bell, when the wires were grounded by such animal, or by any other electrical conductor by such induced current, has been impossible, and hence provision has heretofore and necessarily been made for a switch for the purpose of diverting a portion of the primary current for such and other purposes—*i. e.*, for telegraphing, telephoning, or ringing signal-bells; and, further, so far as I am aware, in electric fences as heretofore constructed when the current by which an animal grounding any of the wires of the fence is submitted to a shock is obtained from an induction-coil such current produces a shock materially differing in character and effect from the shock produced by grounding a fence charged with a current generated from a magneto-electric generator.

The object of my invention is to construct an electrical fence in which the electric current used for repelling animals therefrom is obtained from an induction-coil and a primary battery, and with which, when any or all of the wires forming strands of the fence are grounded by an animal coming in contact therewith and with the ground, a shock similar in character and effect to the shock obtained when a magneto-electric generator is used shall be produced.

A further object of my invention is to obtain an induced electrical current when any of the wires forming strands of the fence are grounded by an animal or by any other conductor with which a magneto-electric alarm-bell placed in the circuit formed by such grounding shall be rung in the same manner as when the current is produced by a magneto-electric generator.

A further object of my invention is to obtain a device wherein, when two or more primary batteries or series of primary batteries are employed, each of said batteries or series of batteries shall be in a closed circuit such portion of the time as such battery or series bears relation to the whole number of batteries or series of batteries.

A further purpose of my invention is to obtain a device of the character described wherein the wires or any one thereof forming the strands of the fence can be readily switched off from the induced-current circuit (or partial circuit) and a telephonic or telegraphic instrument switched onto such wire or wires to be used in the ordinary manner of using such instruments and for a like purpose—that is to say, as a means of communication between a person located in the fence station and a person along the line of the fence. This purpose of my invention is, in the case of a fence inclosing a large area of ground, of great practical use.

In the drawings, Figure 1 represents a perspective view of a plot of ground inclosed, or nearly so, by an electrical fence, a front elevation of the several devices forming elements in such fence, and the electrical-current generators; Fig. 2, an elevation of a portion of the devices illustrated in Fig. 1, with the driving-wheels removed therefrom; Fig. 3, a cross-section of Fig. 2; Fig. 4, a vertical cross-section of that portion of the device illustrated in Fig. 2, whereby the primary batteries are automatically thrown into and out of the closed circuit extending from one of such batteries through the induction-coil and back to the battery; Fig. 5, a horizontal cross-section of the same parts, and Fig. 6 a front elevation thereof. Fig. 7 is an enlarged front elevation of the switch-board forming an element of the device, with the several wires on the back thereof indicated by dotted lines.

Like letters refer to like parts throughout the several views.

W is a field.

A is the fence, composed of wires 1 2 3 4, supported by the posts $a$, so as not to be in connection with the ground.

B is a switch-board, and $B'$ $B^2$ $B^3$ $B^4$ are binding-posts thereon, to which are electrically connected, respectively, outgoing fence-wires 1, 2, 3, and 4.

$b'$ $b^2$ $b^3$ $b^4$ are binding-posts on switch-board B, to which are electrically connected, respectively, the incoming or returning fence-wires 1, 2, 3, and 4.

$b^5$ is a binding-post on switch-board B, to which is electrically connected ground-wire $b$.

The binding-posts $B'$ $B^2$ $B^3$ $B^4$ extend through the board and are respectively electrically connected by wires $p'$ $p^2$ $p^3$ $p^4$, attached thereto on the back of the board, to posts $P'$ $P^2$ $P^3$ $P^4$, which are on the front of the switch-board, adapted to electrically connect with levers $x'$ $x^2$ $x^3$ $x^4$, respectively. Levers $x^2$ $x^3$ $x^4$ are pivoted on lever $x'$ and lever $x'$ is pivoted on post $x$, and when levers $x'$ $x^2$ $x^3$ $x^4$ are in contact with posts $P'$ $P^2$ $P^3$ $P^4$, as illustrated in Fig. 1 of the drawings, such posts are electrically attached to post $x$.

Q Q' $i^2$ $i^3$ are respectively binding-posts on switch-board B, post Q being electrically connected with post $i^3$ by wire $q$ and post Q' with post X by wire $q'$.

$q^2$ is a wire extending from post Q to the electro-magnet of bells O' and O', and $q^3$ is a wire extending from said electro-magnets to posts Q'.

Z is a post on switch-board B, to which is pivoted lever Z', and is electrically connected with post $i^2$ by wire $Z^2$. Pivoted lever Z' can be electrically connected with any one of posts Y Y' $Y^2$ $Y^3$ $Y^4$, and is so connected with that one thereof upon which it is placed.

$y$ is a wire extending on the back of the switch-board B from binding-post $b^5$ to post Y, and $y'$ $y^2$ $y^3$ $y^4$ are respectively wires placed upon the back of the board and extending from binding-posts $b'$ $b^2$ $b^3$ $b^4$ to posts Y' $Y^2$ $Y^3$ $Y^4$ and electrically connecting such posts.

The lever Z' is ordinarily in the position illustrated in Figs. 1 and 7 of the drawings—that is, so as to electrically connect posts Y and Z—and when in this position the ground-wire $b$ is electrically connected, through posts $b^5$, wire $y$, post Y, lever Z', post Z, wire $Z^2$, and post $i^2$, with wire $J^2$, extending to one of the binding-posts of the secondary wire of the induction-coil, forming a part of the device hereinafter described.

When the several levers $x'$ $x^2$ $x^3$ $x^4$ are in the position illustrated in the drawings, Figs. 1 and 7, post X is electrically connected with posts $B'$ $B^2$ $B^3$ $B^4$, and outgoing wires 1, 2, 3, and 4 are electrically connected to the other of the binding-posts of the secondary wire of the induction-coil last above referred to by means of posts $B'$ $B^2$ $B^3$ $B^4$, wires $p'$ $p^2$ $p^3$ $p^4$, posts $P'$ $P^2$ $P^3$ $P^4$, levers $x'$ $x^2$ $x^3$ $x^4$, post $x$, wire $q'$, post Q', wire $q^3$, the electro-magnets of the bells O' O', wire $q^2$, post Q, wire $q$, post $i^3$, and wire $J^3$.

When an animal or any electric conducting material is brought into electrical contact with any of the wires 1, 2, 3, and 4 of the fence and with the ground and such wires are grounded, an electrical circuit is completed—that is to say, if wire 1 of the fence be grounded a closed circuit would be formed from the induction-coil to post $b'$, from thence along wire 1 to the point where wire 1 is grounded, from thence to the ground and along the ground back to the ground plate or plug forming the grounded end of wire $b$, thence over wire $b$ to the induction-coil. An induced current will on the closing of the circuit, as last above described, travel along such circuit. If any other of the wires 1 2 3 4 is in like manner grounded, the circuit of which such wire is one of the elements in place of the wire 1 in the circuit just described will be closed thereby.

The switch-board B and the several wire connections thereto will be more thoroughly understood upon reference to the description thereof contained in my application for a patent therefor now pending in the Patent Office of the United States, Serial No. 362,996.

C is a telephone.

D is a telegraph-instrument.

C' and D' are wires extending, respectively, from telephone C and telegraph-instrument D to binding-posts on the switch-board.

$C^2$ is a switch-bar electrically connected with some one of the fence-wires and adapted to be brought into electrical contact with the binding-posts, to which wires C' and D' are secured.

$D^2$ is a primary battery adapted to generate the current required to use telegraph-instrument D.

$D^3$ is a box in which is inclosed the battery required in the use of the telephone C.

$d$ is a ground-wire extending from battery $D^2$ and the battery contained in box $D^3$ to the ground.

E is a base-board, upon which are mounted the several parts constituting the generator when taken in combination with the primary battery $e\ e'$.

E' is a secondary base-board secured to board E, and having placed between it and the said board E the condenser F for absorption or suppression of the extra current induced by the breaks in the main current through the circuit-breaker G.

H is an induction-coil.

I I' are the secondary wires of the induction-coil H, and J J' are the primary wires thereof. The secondary wires I I' extend to binding-posts $i\ i'$. Wires $I^2\ I^3$ extend to binding-posts $i^2\ i^3$ on switch-board B. Primary wire J of the induction-coil H extends from such induction-coil around spools $g$ of circuit-breaker G and to the frame $g'$ thereof.

$g^2$ is a vibrating arm pivoted at $g^3$ of the frame $g'$. This vibrating arm forms the armature to the magnet-spools $g$ when the primary current of electricity extends around such spools on wire J.

$g^4$ is a metal spring secured to vibrating arm $g^2$ and adapted to alternately be in contact and free from contact with adjustable screw $g^5$.

$g^6$ is a wire extending from adjustable screw $g^5$ to binding-post K.

$k$ is a wire extending from the binding-post K to batteries $e\ e'$, and $f$ is a wire extending from this binding-post K to condenser F.

$f'$ is a wire extending from condenser F to frame $g'$ of the circuit-breaker G.

G' is a covering of porous non-conducting material, placed over one of the poles of the spools $g$ of the circuit-breaker G to elastically receive the inward swing of vibrating arm $g^2$.

$k'\ k^2$ are wires extending, respectively, from batteries $e\ e'$ to binding-posts $K'\ K^2$ on board E.

$k^3$ and $k^4$ are wires extending from binding-posts $K'\ K^2$ to brushes L L'.

M is a shaft which continuously rotates, or is rotated by driving-wheel $M^2$, intermeshing with wheel $M^3$, which is rigidly secured on shaft M. Shaft M turns in and is at all times in electrical contact with plate M', to which is secured the wire J' from the induction-coil H.

$m\ m'$ is a hollow wheel placed on shaft M.

$m^3$ is a spring inclosed in wheel $m\ m'$, one end of the spring being secured to the wheel and one end to the shaft M.

$m^2$ is a tooth on wheel $m\ m'$.

Part $m$ of wheel $m\ m'$ is formed of non-conducting material, as wood, and part $m'$ thereof is formed of conducting material, as brass or copper. It will therefore be seen that the one of the brushes L L' in contact with part $m'$ of wheel $m\ m'$ will be in a closed circuit, in which will be included the primary wire of the induction-coil H and the circuit-breaker G. In order to alternately bring into such circuit the batteries $e\ e'$, the shaft M is continuously revolved, and the wheel $m\ m'$ continuously revolved therewith, or, and as I prefer, such wheel is intermittently revolved by such shaft, and the manner in which I prefer to produce this intermittent motion is by the following devices:

N is a frame pivoted at $n\ n$, and having thereon pallets $n'\ n^2$, adapted to alternately come in contact with or stand in the path of tooth $m^2$ on wheel $m\ m'$.

N' is a cam secured on shaft M and swinging the frame N to the right and to the left as shaft M revolves. It will be observed that if the spring $m^3$ be partially wound the tooth $m^2$ on wheel $m\ m'$ will be pressed thereby against one of the pallets $n'\ n^2$. In Figs. 5 and 6 this tooth $m^2$ is illustrated as pressing against pallet $n^2$. The wheel $m\ m'$ will thereby remain at rest and the spring $m^3$ will be still further wound by the turning of the shaft M, but as such shaft turns the frame N will swing or be swung by cam N' to one side and the pallet $n^2$ drawn away from under tooth $m^2$, while at the same time pallet $n'$ will be swung into the path of the tooth $m^2$, and as such tooth passes by pallet $n^2$ it will be arrested by the pallet $n'$, which in turn will pass out of the path of the tooth $m^2$ and allow it again to pass forward to its position, as illustrated in said drawings.

When the wheel $m\ m'$ is in the position illustrated in Fig. 2, a circuit will be formed extending from the battery to which wire $k'$ is secured, and an electrical current will extend over such wire $k'$ to binding-post K', thence over wire $k^3$ to brush L, thence over brush L to part $m'$ of the wheel $m\ m'$, and from thence through shaft M to plate M', thence over wire J' to the induction-coil and through the primary wire thereof to wire J, and from such wire J to and around the spool $g$ of the circuit-breaker G, thence to frame $g'$ of the circuit-breaker, and from thence to vibrating arm $g^2$ and spring $g^4$ thereon, thence to adjustable screw $g^5$, and from thence over wire $g^6$ to binding-post K, from thence over wire $k$ to the battery $e$, to which such wire is secured. The passing of the current over this circuit last described will magnetize the core of the spools $g$ in the ordinary way, and the vibrating arm $g^2$, being the armature of such spools, will be drawn forward thereby, and the contact of the spring $g^4$, secured on such vibrating arm $g^2$ with adjustable screw $g^5$, will be broken, and the current thereby broken because of the breaking of such circuit, and vibrating arm $g^2$ will again resume its position, as illustrated in drawing Fig. 2. The circuit being thereby again formed, the same operation will be again repeated. At the same time the condenser F being connected to post K and to the circuit-breaker G by wires $f f'$, respectively, any extra currents which would otherwise be generated are thereby destroyed, and the current transmitted over the wires $I^2$ $I^3$ has a very close resemblance in the shock given thereby to the shock given by a current sent over such wires by a magneto-electric generator of the kind described by me as employed in my invention hereinbefore referred to.

When the wheel $m\ m'$ is turned one-half way round from the position illustrated in Fig. 2, part $m'$ of such wheel is in contact with brush L', and such brush, together with wire $k^4$, binding-screw $K^2$, wire $k^2$, and battery $e'$, will be placed into the circuit in place of the brush L, wire $k^3$, binding-post K', wire $k'$, and battery $e$, hereinbefore described as in such circuit.

In order that the current extending over the wires 1 2 3 4 of the fence, when any or all of such wires are grounded, may ring a signal-bell, it is necessary that the coils actuating hammer O of bells O' O' be wound in the ordinary manner of winding magneto-electric signal-bells; but such hammer O must form a vibrating armature to the magnetic coil actuating it, adapted to swing synchronously with vibrating arm $g^2$ of circuit-breaker G.

I have found by experiment that the ordinary magneto-electric bell wound in proper manner to be actuated by the current obtained from a magneto-electric generator will be rung by the current obtained from the induction-coil H when the circuit-breaker G has, as described, vibrating arm $g^2$ as an armature thereof and the condenser F electrically connected therewith in the manner described.

It is of course necessary where a current of the strength required by me is used in the primary wires of the induction-coil that the wire employed in winding the spool $g$ be sufficiently large to allow such current to pass thereover without heating such wire.

The condenser F, hereinbefore referred to, is composed of alternate layers of tin-foil and paper in the ordinary manner.

Having thus described my invention, what I claim, and desire to secure by Letters Patent of the United States, is—

1. In an electrical appliance for generating and maintaining an induced current of electricity, the combination of a primary battery, a circuit-breaker, and an induction-coil contained in the circuit of such primary battery, and a condenser, one of the wires connecting such condenser with such circuit extending from the circuit upon one side of the circuit-breaker and the other of such wires extending therefrom from the other side of such circuit-breaker, and secondary wires extending from the induction-coil, one of such wires being grounded and the other thereof extending around the coils of a magneto-electric bell and to the fence-wire, the hammer of such bell being adapted to move synchronously with the armature of the circuit-breaker, substantially as described.

2. In an electrical appliance for generating and maintaining an induced current of electricity, the combination of primary batteries, a circuit-breaker, and an induction-coil adapted to be contained in the circuit of either of such primary batteries, and a condenser, one of the wires connecting such condenser with such circuit extending from the circuit upon one side of the circuit-breaker and the other of such wires extending therefrom from the other side of such circuit-breaker, brushes each connected with one of the poles of one of the batteries and pressing against a rotatory wheel constructed of two parts, one of such parts being conducting and the other non-conducting material, whereby the primary circuit is alternately formed by one or the other of such primary batteries as an element therein, and secondary wires extending from the induction-coil, one of such wires being grounded and the other thereof extending around the coils of a magneto-electric bell and to the fence-wire, the hammer of such bell being adapted to move synchronously with the armature of such circuit-breaker, substantially as described.

DAVID H. WILSON.

Witnesses:
 ALVIN H. SCHUREMAN,
 R. S. HARTSHORN.